(12) United States Patent
Prins et al.

(10) Patent No.: US 11,920,842 B2
(45) Date of Patent: Mar. 5, 2024

(54) METHOD FOR CONTROLLING A VAPOUR COMPRESSION SYSTEM BASED ON ESTIMATED FLOW

(71) Applicant: Danfoss A/S, Nordborg (DK)

(72) Inventors: Jan Prins, Nordborg (DK); Lars Finn Sloth Larsen, Nordborg (DK)

(73) Assignee: Danfoss A/S, Nordborg (DK)

( * ) Notice: Subject to any disclaimer, the term of this patent is extended or adjusted under 35 U.S.C. 154(b) by 499 days.

(21) Appl. No.: 17/278,723

(22) PCT Filed: Sep. 13, 2019

(86) PCT No.: PCT/EP2019/074500
§ 371 (c)(1),
(2) Date: Mar. 23, 2021

(87) PCT Pub. No.: WO2020/064368
PCT Pub. Date: Apr. 2, 2020

(65) Prior Publication Data
US 2022/0034566 A1 Feb. 3, 2022

(30) Foreign Application Priority Data
Sep. 25, 2018 (EP) ..................................... 18196410

(51) Int. Cl.
*F25B 49/02* (2006.01)

(52) U.S. Cl.
CPC ........ *F25B 49/02* (2013.01); *F25B 2309/061* (2013.01); *F25B 2400/075* (2013.01);
(Continued)

(58) Field of Classification Search
CPC .......... F25B 49/02; F25B 41/31; F25B 41/22; F25B 5/04
See application file for complete search history.

(56) References Cited

U.S. PATENT DOCUMENTS

| | | | |
|---|---|---|---|
| 4,227,862 A | 10/1980 | Andrew et al. | |
| 7,389,648 B2 | 6/2008 | Concha et al. | |

(Continued)

FOREIGN PATENT DOCUMENTS

| | | |
|---|---|---|
| CA | 2855733 A1 | 5/2013 |
| CN | 1926391 A | 3/2007 |

(Continued)

OTHER PUBLICATIONS

International Search Report for PCT Serial No. PCT/EP2019/074352 dated Nov. 27, 2019.

(Continued)

*Primary Examiner* — Nael N Babaa
(74) *Attorney, Agent, or Firm* — McCormick, Paulding & Huber PLLC

(57) ABSTRACT

A method for controlling a vapour compression system (1) including a compressor unit (2) including at least two compressors (3, 12), a heat rejecting heat exchanger (4), a receiver (6), an expansion device (7) and an evaporator (8) arranged in a refrigerant path is disclosed. At least one of the compressors is a main compressor (3) being fluidly connected to an outlet of the evaporator (8) and at least one of the compressors is a receiver compressor (12) being fluidly connected to a gaseous outlet (10) of the receiver (6). A flow of vapour entering the receiver (6), such as a mass flow of vapour entering the receiver (6) is estimated and compared to a first threshold value. In the case that the estimated flow is above the first threshold value, a pressure prevailing inside the receiver (6) is controlled by operating the receiver compressor (12).

20 Claims, 3 Drawing Sheets

(52) U.S. Cl.
CPC ... *F25B 2400/13* (2013.01); *F25B 2600/0251* (2013.01); *F25B 2600/2509* (2013.01)

(56) References Cited

U.S. PATENT DOCUMENTS

| | | |
|---|---|---|
| 7,891,201 B1 | 2/2011 | Bush et al. |
| 10,208,985 B2 | 2/2019 | Najafifard |
| 10,496,108 B2 | 12/2019 | Zha et al. |
| 2001/0037653 A1 | 11/2001 | Yamanaka et al. |
| 2003/0182961 A1 | 10/2003 | Nishida et al. |
| 2004/0237550 A1 | 12/2004 | Yamasaki et al. |
| 2004/0237553 A1 | 12/2004 | Yamasaki et al. |
| 2004/0244407 A1 | 12/2004 | Yamasaki et al. |
| 2005/0126194 A1 | 6/2005 | Ebara et al. |
| 2005/0193753 A1 | 9/2005 | Concha et al. |
| 2006/0277932 A1 | 12/2006 | Otake et al. |
| 2007/0271936 A1 | 11/2007 | Wakamoto et al. |
| 2010/0115975 A1 | 5/2010 | Mitra et al. |
| 2010/0132399 A1 | 6/2010 | Mitra et al. |
| 2010/0175400 A1 | 7/2010 | Kasahara |
| 2011/0036110 A1 | 2/2011 | Fujimoto et al. |
| 2011/0138835 A1 | 6/2011 | Takayama et al. |
| 2011/0154839 A1 | 6/2011 | Mihara et al. |
| 2011/0154840 A1 | 6/2011 | Mihara et al. |
| 2011/0162397 A1 | 7/2011 | Huff et al. |
| 2011/0314846 A1 | 12/2011 | Heinbokel et al. |
| 2012/0117988 A1 | 5/2012 | Mitra et al. |
| 2012/0227427 A1 | 9/2012 | Liu et al. |
| 2012/0318008 A1 | 12/2012 | Liu et al. |
| 2013/0000340 A1 | 1/2013 | Takayama et al. |
| 2013/0298593 A1 | 11/2013 | Christensen |
| 2013/0319036 A1 | 12/2013 | Taras et al. |
| 2014/0151015 A1 | 6/2014 | Sun et al. |
| 2014/0157811 A1 | 6/2014 | Shimazu et al. |
| 2014/0208785 A1 | 7/2014 | Wallace et al. |
| 2014/0245767 A1 | 9/2014 | Miyakoshi et al. |
| 2014/0326018 A1 | 11/2014 | Ignatiev |
| 2014/0352343 A1 | 12/2014 | Hinde et al. |
| 2015/0219379 A1 | 8/2015 | Sun et al. |
| 2015/0300713 A1 | 10/2015 | Sun et al. |
| 2016/0047578 A1 | 2/2016 | Warren |
| 2016/0102901 A1 | 4/2016 | Christensen et al. |
| 2016/0231040 A1 | 8/2016 | Hellmann |
| 2016/0298883 A1 | 10/2016 | Louvar et al. |
| 2017/0159977 A1 | 6/2017 | Hellmann |
| 2017/0321941 A1 | 11/2017 | Fredslund et al. |
| 2017/0328604 A1 | 11/2017 | Fredslund et al. |
| 2018/0142927 A1 | 5/2018 | Hellmann et al. |
| 2018/0164004 A1 | 6/2018 | Schmidt et al. |
| 2018/0216851 A1 | 8/2018 | Christensen et al. |
| 2018/0283750 A1 | 10/2018 | Prins et al. |
| 2018/0320944 A1 | 11/2018 | Prins et al. |
| 2019/0376728 A1 | 12/2019 | Hayes et al. |

FOREIGN PATENT DOCUMENTS

| | | |
|---|---|---|
| CN | 101688697 A | 3/2010 |
| CN | 101809378 A | 8/2010 |
| CN | 103717981 A | 4/2014 |
| CN | 107076475 A | 12/2017 |
| CN | 108139132 B | 6/2018 |
| DE | 102006050232 B3 | 2/2008 |
| EP | 3023712 A1 | 5/2016 |
| EP | 3023714 A1 | 5/2016 |
| EP | 3371523 A1 | 9/2018 |
| EP | 2999932 B1 | 7/2019 |
| EP | 3581860 A1 | 12/2019 |
| EP | 3798533 A1 | 3/2021 |
| FR | 2992913 A1 | 1/2014 |
| WO | 2006015629 A1 | 2/2006 |
| WO | 2006015741 A1 | 2/2006 |
| WO | 2008130357 A1 | 10/2008 |
| WO | 2008130359 A1 | 10/2008 |
| WO | 2009039873 A1 | 4/2009 |
| WO | 2009041959 A1 | 4/2009 |
| WO | 2009091397 A1 | 7/2009 |
| WO | 2009091398 A1 | 7/2009 |
| WO | 2009091400 A1 | 7/2009 |
| WO | 2010039682 A2 | 4/2010 |
| WO | 2011049767 A2 | 4/2011 |
| WO | 2011049778 A1 | 4/2011 |
| WO | 2011112495 A2 | 9/2011 |
| WO | 2012076049 A1 | 6/2012 |
| WO | 2012109057 A2 | 8/2012 |
| WO | 2013016403 A1 | 1/2013 |
| WO | 2013169591 A1 | 11/2013 |
| WO | 2014031559 A1 | 2/2014 |
| WO | 2014179442 A1 | 11/2014 |
| WO | 2017067858 A1 | 4/2017 |
| WO | 2017076798 A1 | 5/2017 |
| WO | 2017220702 A1 | 12/2017 |
| WO | 2018095787 A1 | 5/2018 |

OTHER PUBLICATIONS

International Search Report for PCT Serial No. PCT/EP2015/073155 dated Jan. 20, 2016.
First Examination Report for Indian Serial No. 201717021000 dated Aug. 30, 2019.
International Search Report for PCT Serial No. PCT/EP2019/074500 dated Nov. 25, 2019.
First Examination Report for Indian Serial No. 202017056337 dated Jan. 6, 2022.

METHOD FOR CONTROLLING A VAPOUR COMPRESSION SYSTEM BASED ON ESTIMATED FLOW

CROSS-REFERENCE TO RELATED APPLICATIONS

This application is a National Stage application of International Patent Application No PCT/EP2019/074500, filed on Sep. 13, 2019, which claims priority to European Application No. 18196410.7 filed on Sep. 25, 2018, each of which is hereby incorporated by reference in its entirety.

TECHNICAL FIELD

The present invention relates to a method for controlling a vapour compression system comprising a compressor unit, a heat rejecting heat exchanger, a receiver, an expansion device and an evaporator arranged in a refrigerant path, the vapour compression system further comprising a receiver compressor being fluidly connected to a gaseous outlet of the receiver. The method according to the invention allows the vapour compression system to be operated in an energy efficient manner under various ambient conditions, without introducing excessive wear on the receiver compressor.

BACKGROUND

In vapour compression systems refrigerant circulates a refrigerant path having at least a compressor, a heat rejecting heat exchanger, an expansion device and an evaporator arranged therein. Thereby the refrigerant is alternatingly compressed in the compressor and expanded in the expansion device, and heat exchange takes place between the refrigerant and appropriate secondary fluid flows or the ambient in the heat rejecting heat exchanger and the evaporator. Thereby cooling or heating of a closed volume can be obtained.

In some vapour compression systems a receiver is arranged in the refrigerant path between an outlet of the heat rejecting heat exchanger and an inlet of the expansion device. In this case the refrigerant is separated into a liquid part and a gaseous part in the receiver, and the liquid part of the refrigerant is supplied to the evaporator, via the expansion device. The gaseous part of the refrigerant may be supplied directly to a receiver compressor. Thereby the gaseous part of the refrigerant is not subjected to the pressure drop introduced by the expansion device, and the work required in order to compress the refrigerant can therefore be reduced. Alternatively, the gaseous refrigerant may be supplied from the receiver to a suction line, via a bypass valve. In this case the gaseous refrigerant is subjected to a pressure drop in the bypass valve, and is mixed with refrigerant leaving the evaporator before being supplied to a main compressor.

In some cases the amount of gaseous refrigerant entering the receiver is very low. This may, e.g., be the case when the outdoor temperature is low, such as during winter time. A low amount of gaseous refrigerant entering the receiver may have the consequence that an insufficient supply of gaseous refrigerant is available for the receiver compressor to operate properly, and that the receiver compressor therefore needs to be switched off. If the available supply of gaseous refrigerant, corresponding to the amount of vapour entering the receiver, is approximately at a level corresponding to the minimum compressor capacity of the receiver compressor, this may result in repeated switching on and off of the receiver compressor, leading to excessive wear on the receiver compressor.

WO 2014/179442 A1 discloses systems and methods for controlling pressure in a $CO_2$ refrigeration system. The pressure control system includes a pressure sensor, a gas bypass valve, a parallel compressor, and a controller. The pressure sensor is configured to measure a pressure within a receiving tank of the $CO_2$ refrigeration system. The controller is configured to receive a pressure measurement from the pressure sensor and operate both the gas bypass valve and the parallel compressor, in response to the pressure measurement, to control the pressure within the receiving tank.

EP 3 023 712 A1 discloses a method for controlling a vapour compression system with a compressor unit comprising one or more compressors. At least one of the compressors is connectable to a gaseous outlet of a receiver, and at least one of the compressors is connectable to an outlet of an evaporator. A setpoint value for a pressure inside the receiver is calculated, based on a measured parameter which represents enthalpy of refrigerant leaving the heat rejecting heat exchanger. Subsequently, the compressor unit is operated in accordance with the calculated setpoint value, and in order to obtain a pressure inside the receiver which is equal to the calculated setpoint value.

US 2014/0326018 A1 discloses a climate-control system having multiple compressors and multiple heat exchangers. The compressors are controlled on the basis of measurements of a pressure prevailing inside a flash tank.

SUMMARY

It is an object of embodiments of the invention to provide a method for controlling a vapour compression system comprising a receiver compressor, in which wear on the receiver compressor is minimised.

It is a further object of embodiments of the invention to provide a method for controlling a vapour compression system comprising a receiver compressor, in which the vapour compression system is operated in an energy efficient manner without introducing excessive wear on the receiver compressor.

The invention provides a method for controlling a vapour compression system comprising a compressor unit comprising at least two compressors, a heat rejecting heat exchanger, a receiver, an expansion device and an evaporator arranged in a refrigerant path, the expansion device being arranged to control a supply of refrigerant to the evaporator, at least one of the compressors being a main compressor being fluidly connected to an outlet of the evaporator and at least one of the compressors being a receiver compressor being fluidly connected to a gaseous outlet of the receiver, the method comprising the steps of:

estimating a flow of vapour entering the receiver,
comparing the estimated flow to a first threshold value, and
in the case that the estimated flow is above the first threshold value, controlling a pressure prevailing inside the receiver by operating the receiver compressor.

Thus, the method according to the invention is for controlling a vapour compression system. In the present context the term 'vapour compressions system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises a compressor unit comprising at least two compressors, a heat rejecting heat exchanger, a receiver, an expansion device and an evaporator arranged in a refrigerant path. The expansion device is arranged to control a supply of refrigerant to the evaporator.

At least one of the compressors is a main compressor being fluidly connected to an outlet of the evaporator. Accordingly, refrigerant leaving the evaporator is supplied to and compressed by the main compressor. Furthermore, at least one of the compressors is a receiver compressor being fluidly connected to a gaseous outlet of the receiver. Accordingly, gaseous refrigerant may be supplied directly from the receiver to the receiver compressor.

The heat rejecting heat exchanger could, e.g., be in the form of a condenser, in which refrigerant is at least partly condensed, or in the form of a gas cooler, in which refrigerant is cooled, but remains in a gaseous or trans-critical state. The expansion device could, e.g., be in the form of an expansion valve.

Thus, refrigerant flowing in the refrigerant path is compressed by the compressors of the compressor unit. The compressed refrigerant is supplied to the heat rejecting heat exchanger, where heat exchange takes place with the ambient, or with a secondary fluid flow across the heat rejecting heat exchanger, in such a manner that heat is rejected from the refrigerant flowing through the heat rejecting heat exchanger. In the case that the heat rejecting heat exchanger is in the form of a condenser, the refrigerant is at least partly condensed when passing through the heat rejecting heat exchanger. In the case that the heat rejecting heat exchanger is in the form of a gas cooler, the refrigerant flowing through the heat rejecting heat exchanger is cooled, but it remains in a gaseous or trans-critical state.

From the heat rejecting heat exchanger, the refrigerant is supplied to the receiver, possibly via a high pressure expansion device, such as a high pressure valve or an ejector. In the receiver, the refrigerant is separated into a liquid part and a gaseous part. The liquid part of the refrigerant is supplied to the expansion device, where expansion takes place and the pressure of the refrigerant is reduced, before the refrigerant is supplied to the evaporator. The refrigerant being supplied to the evaporator is thereby in a mixed gaseous and liquid state. In the evaporator, the liquid part of the refrigerant is at least partly evaporated, while heat exchange takes place with the ambient, or with a secondary fluid flow across the evaporator, in such a manner that heat is absorbed by the refrigerant flowing through the evaporator. Finally, the refrigerant is supplied to the main compressor of the compressor unit.

The gaseous part of the refrigerant in the receiver may be supplied to the receiver compressor. Thereby the gaseous part of the refrigerant is not subjected to the pressure drop introduced by the expansion device, and the work required in order to compress the refrigerant can thereby be reduced. Accordingly, energy is conserved. Alternatively or additionally, at least part of the gaseous refrigerant in the receiver may be supplied to the suction line via a bypass valve, and subsequently supplied to the main compressor.

According to the method of the invention, a flow of vapour entering the receiver is initially estimated. In the present context the term 'flow of vapour' should be interpreted to mean a flow of refrigerant in vapour form. The flow of vapour entering the receiver provides a suitable indication regarding how much gaseous refrigerant will be available for the receiver compressor. The flow of vapour entering the receiver depends on the total flow of refrigerant to the receiver, as well as on the liquid-vapour ratio of the refrigerant being supplied to the receiver. This will be described in further detail below.

The flow of vapour entering the receiver could advantageously be a mass flow of vapour entering the receiver. As an alternative, the flow of vapour entering the receiver could be a volume flow of vapour entering the receiver.

Next, the estimated flow is compared to a first threshold value. As described above, when the flow of vapour entering the receiver is low, the supply of gaseous refrigerant to the receiver compressor may be insufficient to ensure appropriate operation of the receiver compressor, including avoiding excessive switching on and off of the receiver compressor. On the other hand, when the flow of vapour entering the receiver is high, the supply of gaseous refrigerant to the receiver compressor is sufficient to ensure proper operation of the receiver compressor. In this case it is desirable to compress the gaseous part of the refrigerant in the receiver by means of the receiver compressor, because this ensures an energy efficient operation of the vapour compression system. The first threshold value may advantageously be selected as a value which defines a suitable boundary between a situation where the flow of vapour entering the receiver is insufficient to ensure a sufficient refrigerant supply to the receiver compressor, and a situation where this is not the case.

The first threshold value may be a fixed value, or it may be a dynamic value which changes in accordance with the prevailing operating conditions, such as an outdoor temperature, etc.

Thus, in the case that the comparison reveals that the estimated flow is above the first threshold value, a pressure prevailing inside the receiver is controlled by operating the receiver compressor. As described above, an estimated flow of vapour entering the receiver, which is above the first threshold value, indicates that the available amount of gaseous refrigerant in the receiver is sufficient to ensure that a supply of refrigerant to the receiver compressor allows the receiver compressor to operate in an appropriate manner. The gaseous refrigerant in the receiver may therefore, in this case, advantageously be supplied to the receiver compressor rather than, for instance, to the suction line via a bypass valve.

On the other hand, in the case that the estimated flow is below the first threshold value, the flow of vapour entering the receiver may be insufficient to ensure a sufficient refrigerant supply to the receiver compressor. Therefore, in this case the pressure prevailing inside the receiver should be controlled without the use of the receiver compressor.

It is not ruled out that a decision of switching on the receiver compressor is made based on a comparison between the estimated flow of vapour and one threshold value, whereas a decision of switching off the receiver compressor is made based on a comparison between the estimated flow of vapour and another, lower, threshold value. Thereby it is prevented that the receiver compressor is repeatedly switched on and off if the estimated flow of vapour entering the receiver is close to the threshold value, i.e. a small hysteresis is allowed in the system.

Thus, the method according to the invention ensures that the pressure prevailing inside the receiver is only controlled by means of the receiver compressor when an expected supply of gaseous refrigerant from the receiver to the receiver compressor is sufficient to allow the receiver compressor to operate in an appropriate manner. Thereby it is avoided that the receiver compressor is repeatedly switched on and off, and the excessive wear on the receiver compressor caused by such repeatedly switching on and off is also avoided. Accordingly, it is ensured that the vapour compression system is operated in an energy efficient manner, using the receiver compressor whenever this is appropriate, while avoiding excessive wear on the receiver compressor.

It is an advantage that the decision regarding whether or not to control the pressure prevailing inside the receiver is taken based on an estimation of the flow of vapour entering the receiver, because this provides a very accurate measure for the available supply of gaseous refrigerant from the receiver. Furthermore, the estimate of the flow of vapour entering the receiver is independent of whether or not the receiver compressor is running and whether or not a bypass valve interconnecting the gaseous outlet of the receiver and the main compressor is open. Thereby the estimated flow of vapour entering the receiver provides an appropriate basis for deciding whether or not to control the pressure inside the receiver by means of the receiver compressor, regardless of how the vapour compression system is currently operated.

The first threshold value may be related to a minimum capacity of the receiver compressor. In this case the first threshold value reflects the minimum amount of available gaseous refrigerant required in order to keep the receiver compressor running continuously, i.e. without repeatedly switching the receiver compressor on and off. Thereby it is efficiently ensured that the pressure prevailing inside the receiver is only controlled by operating the receiver compressor if this will not result in excessive wear on the receiver compressor.

As an alternative, the first threshold value may be defined in any other suitable manner, such as based on a minimum duty cycle of the receiver compressor.

The step of estimating the flow of vapour entering the receiver may be performed based on a current compressor capacity of the compressor unit. According to this embodiment the step of estimating the flow of vapour entering the receiver comprises obtaining the current compressor capacity of the compressor unit. The obtained current compressor capacity is then used during the estimation of the flow of vapour entering the receiver. The current compressor capacity determines the supply of refrigerant to the heat rejecting heat exchanger, and thereby the supply of refrigerant from the heat rejecting heat exchanger to the receiver. Accordingly, adjusting the compressor capacity of the compressor unit has an impact on the total flow of refrigerant to the receiver, in that increasing compressor capacity increases the total flow of refrigerant to the receiver and decreasing the compressor capacity decreases the total flow of refrigerant to the receiver. Therefore information regarding the total flow of refrigerant to the receiver can be derived from the current compressor capacity. Since the flow of vapour entering the receiver depends on the total flow of refrigerant to the receiver, the current compressor capacity thereby provides a suitable starting point for deriving an estimate for the flow of vapour entering the receiver.

Alternatively or additionally, the step of estimating the flow of vapour entering the receiver may be performed based on an enthalpy of refrigerant leaving heat rejecting heat exchanger. According to this embodiment the step of estimating the flow of vapour entering the receiver comprises obtaining the enthalpy of refrigerant leaving the heat rejecting heat exchanger, or at least a parameter being representative for the enthalpy of refrigerant leaving the heat rejecting heat exchanger. The obtained enthalpy is then used during the estimation of the flow of vapour entering the receiver. The enthalpy of the refrigerant leaving the heat rejecting heat exchanger has an impact on the liquid-vapour ratio of the refrigerant leaving the heat rejecting heat exchanger, and thereby on the liquid-vapour ratio of the refrigerant being supplied to the receiver. Accordingly, from the enthalpy of refrigerant leaving the heat rejecting heat exchanger it is possible to derive a distribution of liquid refrigerant and vapour refrigerant in the flow of refrigerant. This may serve as an appropriate starting point for estimating the flow of vapour entering the receiver.

The enthalpy of refrigerant leaving the heat rejecting heat exchanger could, e.g., be estimated directly, or it could be derived from one or more measured parameters, such as one or more measured temperature values and/or one or more measured pressure values.

The step of estimating a flow of vapour entering the receiver may advantageously be based on information regarding the total supply of refrigerant to the receiver, e.g. in the form of the current compressor capacity, as well as on information regarding the liquid-vapour ratio of the refrigerant being supplied to the receiver, e.g. in the form of the enthalpy of refrigerant leaving the heat rejecting heat exchanger.

The vapour compression system may further comprise a high pressure expansion device arranged in the refrigerant path between an outlet of the heat rejecting heat exchanger and an inlet of the receiver, and the step of estimating the flow of vapour entering the receiver may be performed based on a flow through the high pressure expansion device.

According to this embodiment, a high pressure expansion device is arranged in the refrigerant path between an outlet of the heat rejecting heat exchanger and an inlet of the receiver. Accordingly, refrigerant leaving the heat rejecting heat exchanger passes through the high pressure expansion device before being supplied to the receiver. Thus, the flow through the high pressure expansion device determines the flow of refrigerant to the receiver. The estimated flow may, e.g., be derived using an opening degree of the high pressure expansion device.

Furthermore, the refrigerant passing through the high pressure expansion device undergoes expansion, and this affects the liquid-vapour ratio of the refrigerant, and thereby has an impact on the flow of vapour entering the receiver.

The high pressure expansion device may be in the form of a high pressure valve, in which case the refrigerant is merely expanded when passing through the high pressure valve.

As an alternative, the high pressure expansion device may be in the form of an ejector having a primary inlet connected to the outlet of the heat rejecting heat exchanger, an outlet connected to the receiver and a secondary inlet connected to the outlet of the evaporator. Thereby at least some of the refrigerant leaving the evaporator is supplied to the secondary inlet of the ejector, instead of to the main compressor. An ejector is a type of pump which uses the Venturi effect to increase the pressure energy of fluid at a suction inlet (or secondary inlet) of the ejector by means of a motive fluid supplied to a motive inlet (or primary inlet) of the ejector. Thereby, arranging an ejector in the refrigerant path as described above will cause the refrigerant to perform work, and thereby the power consumption of the vapour compression system is reduced as compared to the situation where no ejector is provided.

As another alternative, the high pressure expansion device may comprise at least one high pressure valve and at least one ejector arranged fluidly in parallel.

The vapour compression system may further comprise a bypass valve fluidly interconnecting the gaseous outlet of the receiver and the main compressor, and the method may further comprise the steps of:

comparing the estimated flow to a second threshold value, and in the case that the estimated flow is above the second threshold value, opening the bypass valve and controlling the pressure prevailing inside the receiver by operating the receiver compressor and the bypass valve.

According to this embodiment, a bypass valve allows at least part of the gaseous refrigerant of the receiver to be supplied to the suction line, and thereby to the main compressor, rather than to the receiver compressor. In order to establish whether or not this will be suitable, the estimated flow is compared to a second threshold value. The second threshold value is typically higher than the first threshold value, and may represent a flow of vapour entering the receiver above which operating the receiver compressor is not sufficient to control the pressure prevailing inside the receiver in a desired manner.

Accordingly, in the case that the comparison reveals that the estimated flow is above the second threshold value, the pressure prevailing inside the receiver is controlled by operating the receiver compressor and the bypass valve. Thereby the pressure prevailing inside the receiver is controlled by operating the receiver compressor to the greatest possible extent. However, in the case that this is insufficient to ensure a desired pressure level inside the receiver, the bypass valve can be opened and some of the gaseous refrigerant can thereby be supplied to the suction line and thereby to the main compressor. Thus, the vapour compression system is operated in as energy efficient manner as possible, while it is ensured that the pressure prevailing inside the receiver is controlled to a desirable level.

The second threshold value may be related to a maximum capacity of the receiver compressor. According to this embodiment, the second threshold value reflects the maximum amount of available gaseous refrigerant which the receiver compressor is capable of removing from the receiver. In this case the receiver compressor may be controlled to continue operating at its maximum capacity level, and the pressure prevailing inside the receiver may be controlled by appropriately controlling the main compressors and/or an opening degree of the bypass valve.

As an alternative, the bypass valve may simply be opened if the receiver compressor is running at maximum capacity and the pressure prevailing inside the receiver exceeds above an acceptable pressure level.

For instance, the receiver compressor and the bypass valve may be controlled by means of separate controllers or separate control algorithms, but an overall controller or control algorithm may decide which of the controllers or control algorithms takes precedence over the other. In this case, when the estimated flow of vapour entering the receiver is below the first threshold value, the bypass valve controller takes precedence. When the estimated flow of vapour entering the receiver is between the first threshold value and the second threshold value, the receiver compressor controller takes precedence. Finally, when the estimated flow of vapour entering the receiver is above the second threshold value, the bypass valve controller takes precedence.

The method may further comprise the step of, in the case that the estimated flow is below the first threshold value, maintaining the receiver compressor in a non-operating state in the case that it is not operating.

As described above, when the estimated flow is below the first threshold value, this is an indication that the flow of vapour entering the receiver is insufficient to ensure that the receiver compressor can operate continuously, i.e. without repeatedly switching the receiver compressor on and off. Thus, when this situation occurs, the pressure prevailing inside the receiver should not be controlled by operating the receiver compressor. Instead, the receiver compressor should be kept in a switched off, or non-operating, state as long as the situation described above prevails. Therefore, if the receiver compressor is already switched off, i.e. not running, it is prevented from being switched on. In the case that the receiver compressor is already switched on, i.e. running, it may, however, be kept in the switched on state as long as the pressure prevailing inside the receiver is within an acceptable range, in order to avoid unnecessary switching on and off of the receiver compressor.

As described above, it is not ruled out that one threshold value is applied when deciding whether or not to switch on the receiver compressor, while another, lower, threshold value is applied when deciding whether or not to switch off the receiver compressor. Thereby a small hysteresis is allowed in the system, and it is prevented that the receiver compressor is repeatedly switched on and off if the estimated flow is close to the threshold value.

As described above, the vapour compression system may further comprise a bypass valve fluidly interconnecting the gaseous outlet of the receiver and the main compressor, and the method may further comprise the step of controlling a pressure prevailing inside the receiver by means of the bypass valve. According to this embodiment, in the case that the estimated flow is below the first threshold value, and the pressure prevailing inside the receiver should therefore not be controlled by operating the receiver compressor, the pressure prevailing inside the receiver is instead controlled by means of the bypass valve. In particular, the pressure prevailing inside the receiver may be controlled by opening the bypass valve and subsequently controlling the pressure prevailing inside the receiver by operating the main compressor, and/or by controlling an opening degree of the bypass valve.

The vapour compression system may further comprise an air condition unit having an outlet being fluidly connected to an inlet of the receiver, and the step of estimating the flow of vapour into the receiver may be performed based on a load of the air condition unit.

For instance, the air conditioning unit may have an inlet being fluidly connected to a liquid outlet of the receiver and an outlet being fluidly connected to a gaseous inlet of the receiver.

According to this embodiment, an air condition unit is connected to the vapour compression system in such a manner that a part of the liquid refrigerant in the receiver is supplied to the air condition unit, evaporated therein and returned to the receiver in the form of vapour. Accordingly, operation of the air condition unit affects the vapour-liquid ratio of the refrigerant entering the receiver, and the refrigerant being supplied to the receiver from the air condition unit forms part of the flow of vapour entering the receiver. Thus, it is appropriate to take the load of the air condition unit into account when estimating the flow of vapour entering the receiver.

BRIEF DESCRIPTION OF THE DRAWINGS

The invention will now be described in further detail with reference to the accompanying drawings in which.

DETAILED DESCRIPTION

Figure 1:
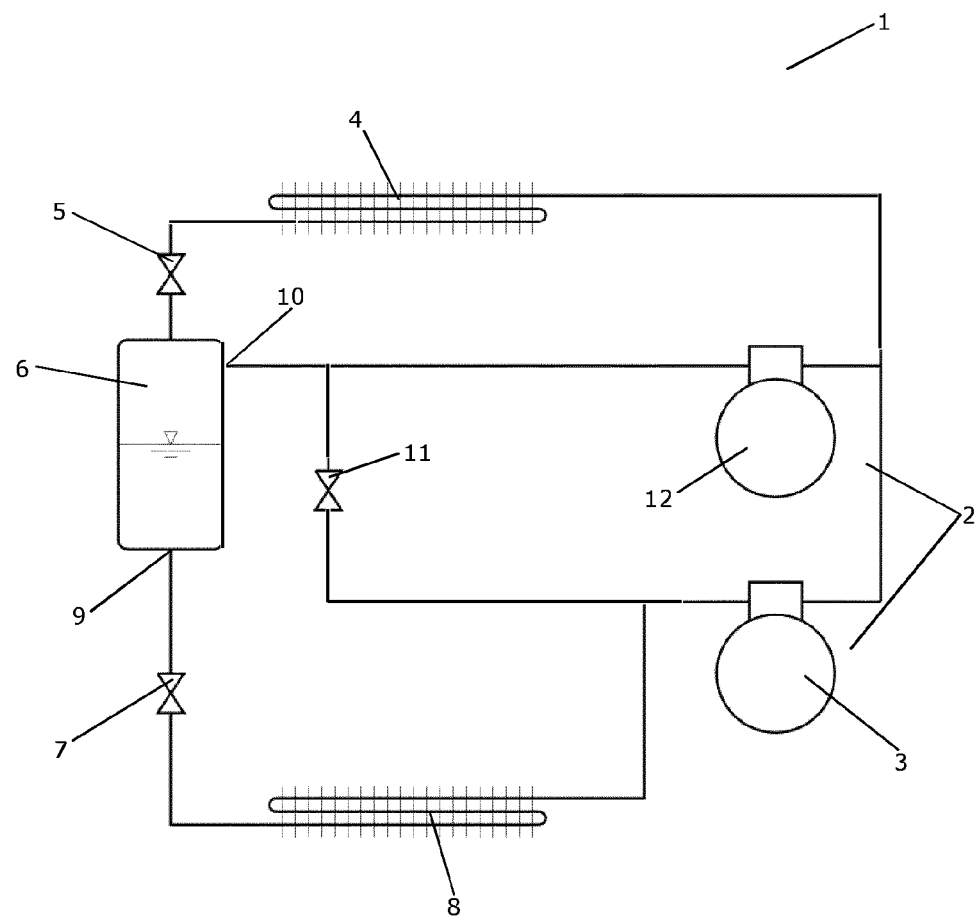
FIGS. 1 and 2 are diagrammatic views of two different vapour compression systems, each being controlled in accordance with a method according to an embodiment of the invention.

FIG. 1 is a diagrammatic view of a vapour compression system 1 being controlled in accordance with a method according to a first embodiment of the invention. The vapour compression system 1 comprises a compressor unit 2 comprising at least two compressors 3, 12, two of which are shown, a heat rejecting heat exchanger 4, a high pressure valve 5, a receiver 6, an expansion valve 7 and an evaporator 8 arranged in a refrigerant path. Compressor 3 is a main compressor which is fluidly connected to an outlet of the evaporator 8, and compressor 12 is a receiver compressor which is fluidly connected to a gaseous outlet 10 of the receiver 6.

Refrigerant flowing in the refrigerant path is compressed by the compressors 3, 12 before being supplied to the heat rejecting heat exchanger 4. In the heat rejecting heat exchanger 4, heat exchange takes place between the refrigerant flowing through the heat rejecting heat exchanger 4 and the ambient or a secondary fluid flow across the heat rejecting heat exchanger 4, in such a manner that heat is rejected from the refrigerant. In the case that the heat rejecting heat exchanger 4 is in the form of a condenser, the refrigerant is thereby at least partly condensed. In the case that the heat rejecting heat exchanger 4 is in the form of a gas cooler, the refrigerant flowing through the heat rejecting heat exchanger 4 is cooled, but it remains in a gaseous or trans-critical state.

The refrigerant leaving the heat rejecting heat exchanger 4 is passed through the high pressure valve 5, where it undergoes expansion before being supplied to the receiver 6. In the receiver 6, the refrigerant is separated into a liquid part and a gaseous part. The liquid part of the refrigerant leaves the receiver 6 via a liquid outlet 9, and is supplied to the expansion device 7, where it undergoes expansion before being supplied to the evaporator 8. The refrigerant being supplied to the evaporator 8 is thereby in a mixed gaseous and liquid state.

In the evaporator 8, heat exchange takes place between the refrigerant flowing through the evaporator 8 and the ambient or a secondary fluid flow across the evaporator 8, in such a manner that heat is absorbed by the refrigerant, while the liquid part of the refrigerant is at least partly evaporated. Finally, the refrigerant leaving the evaporator 8 is supplied to the main compressor 3.

The gaseous part of the refrigerant in the receiver 6 may be supplied directly to the main compressor 3, via a gaseous outlet 10 and a bypass valve 11. Alternatively, the gaseous refrigerant from the receiver 6 may be supplied directly to the receiver compressor 12, and may therefore be compressed without having to be mixed with refrigerant leaving the evaporator 8.

The vapour compression system 1 of FIG. 1 may be controlled in the following manner. Initially, a flow of vapour entering the receiver 6 is estimated. This could include estimating the flow based on the current compressor capacity of the compressor unit 2 and/or estimating the flow based on an enthalpy of refrigerant leaving the heat rejecting heat exchanger 4. The current compressor capacity of the compressor unit 2 has an impact on the total flow of refrigerant to the heat rejecting heat exchanger 4, and thereby to the receiver 6, and the enthalpy of refrigerant leaving the heat rejecting heat exchanger 4 has an impact on the liquid-vapour ratio of the refrigerant being supplied to the receiver 6. Both of these factors are relevant with respect to estimating the flow of vapour entering the receiver 6.

Next, the estimated flow is compared to a first threshold value. The first threshold value may be related to a minimum capacity of the receiver compressor 12. Thereby the first threshold value represents a flow of vapour entering the receiver 6, which results in an available amount of gaseous refrigerant in the receiver 6 being the minimum amount required in order to ensure that the receiver compressor 12 operates in an appropriate manner, e.g. continuously and without repeatedly switching the receiver compressor 12 on and off.

In the case that the comparison reveals that the estimated flow is above the first threshold value, a pressure prevailing inside the receiver 6 is controlled by operating the receiver compressor 12. Thus, the pressure prevailing inside the receiver 6 is only controlled by means of the receiver compressor 12 if it is possible to operate the compressor receiver 12 in an appropriate manner, notably without repeatedly switching the receiver compressor on and off. However, the receiver compressor 12 is used for this purpose whenever this is appropriate. Thereby it is ensured that the vapour compression system 1 is operated in an energy efficient manner without risking excessive wear on the receiver compressor 12.

When the estimated flow is below the first threshold value, the pressure prevailing inside the receiver 6 is controlled in another way, e.g. by opening the bypass valve 11 and controlling the pressure prevailing inside the receiver 6 by operating the main compressor 3 and/or by controlling an opening degree of the bypass valve 11.

The estimated flow may further be compared to a second threshold value being higher than the first threshold value. The second threshold value could, e.g., be related to a maximum capacity of the receiver compressor 12. Thereby the second threshold value represents a flow of vapour entering the receiver 6, which results in an available amount of gaseous refrigerant in the receiver 6 being the maximum amount which the receiver compressor 12 is capable of removing from the receiver 6.

In the case that the comparison reveals that the estimated flow is above the second threshold value, the bypass valve 11 may be opened, and the pressure prevailing inside the receiver 6 may be controlled by operating the receiver compressor 12 and the main compressor 3. Thus, according to this embodiment, the bypass valve 11 is opened when the available amount of gaseous refrigerant in the receiver 6 exceeds the capacity of the receiver compressor 12, and the excess refrigerant is therefore supplied to the main compressor 3 via the bypass valve 11.

Figure 2:
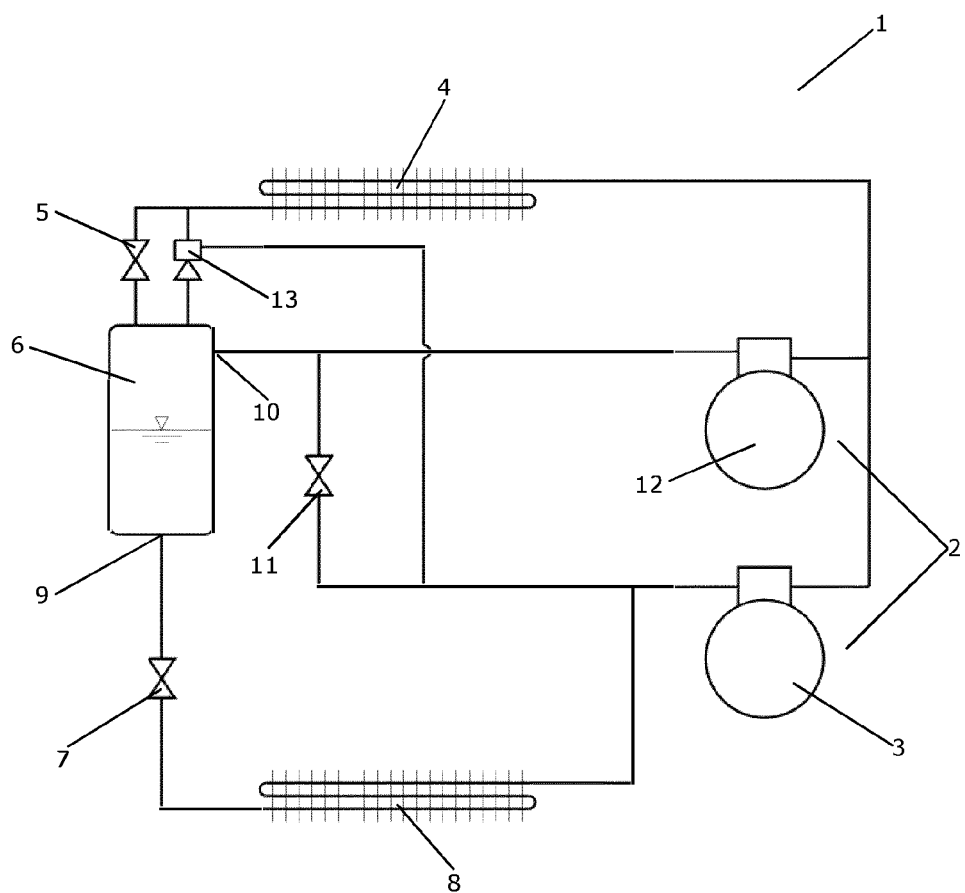

FIG. 2 is a diagrammatic view of a vapour compression system 1 being controlled in accordance with a method according to a second embodiment of the invention. The vapour compression system 1 of FIG. 2 is very similar to the vapour compression system 1 of FIG. 1, and it will therefore not be described in detail here.

In the vapour compression system 1 of FIG. 2, an ejector 13 is arranged fluidly in parallel with the high pressure valve 5. Accordingly, refrigerant leaving the heat rejecting heat exchanger 4 may pass through the high pressure valve 5 or through the ejector 13. The ejector 13 further has its secondary inlet connected to the outlet of the evaporator 8.

Accordingly, refrigerant leaving the evaporator 8 may either be supplied to the compressor 3 or to the ejector 13. Thereby the refrigerant flow from the evaporator 8 to the secondary inlet of the ejector 13 must also be taken into account when estimating the flow of vapour entering the receiver 6.

Figure 3:
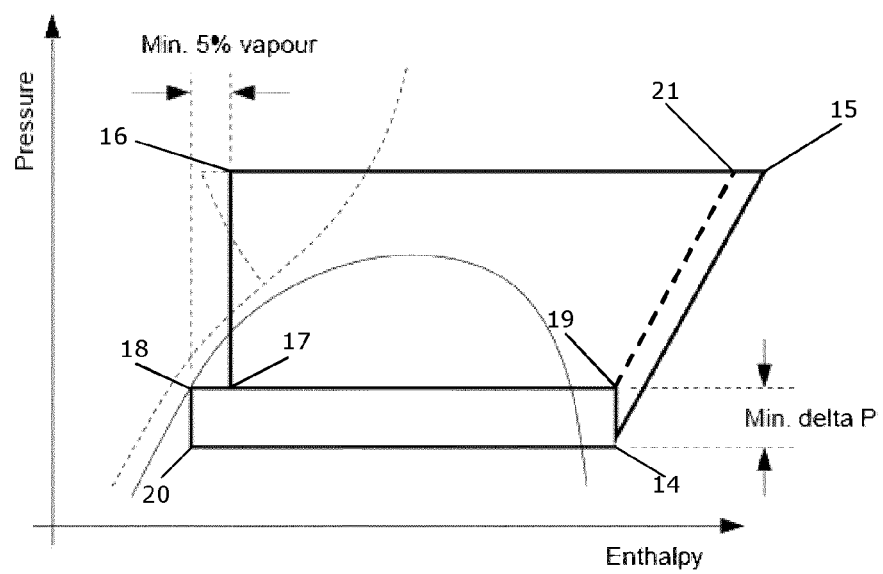
FIG. 3 is a log(P)-h diagram illustrating control of a vapour compression system in accordance with a method according to an embodiment of the invention.

FIG. 3 is a log(P)-h diagram illustrating control of a vapour compression system in accordance with a method according to an embodiment of the invention. The vapour compression system being controlled could, e.g., be one of the vapour compression systems illustrated in FIGS. 1 and 2. From point 14 to point 15 the refrigerant is compressed by a main compressor in the compressor unit. Thereby the pressure as well as the enthalpy is increased. From point 15 to point 16 the refrigerant passes through the heat rejecting heat exchanger, where heat exchange takes place between the refrigerant and the ambient or a secondary fluid flow across the heat rejecting heat exchanger, in such a manner that heat is rejected from the refrigerant. Thereby the enthalpy is decreased, while the pressure remains constant.

From point 16 to point 17 the refrigerant passes through a high pressure valve or an ejector, where the refrigerant undergoes expansion, and is received in the receiver. Thereby the pressure is decreased, while the enthalpy remains substantially constant.

In the receiver the refrigerant is separated into a liquid part and a gaseous part. Point 18 represents the liquid part of the refrigerant in the receiver, and point 19 represents the gaseous part of the refrigerant in the receiver. From point 18 to point 20 the liquid part of the refrigerant in the receiver is passed through the expansion device, where it undergoes expansion. Thereby the pressure is reduced while the enthalpy remains constant. From point 20 to point 14 the refrigerant passes through the evaporator, where heat exchange takes place between the refrigerant and the ambient or a secondary fluid flow across the evaporator, in such a manner that heat is absorbed by the refrigerant. Thereby the enthalpy is increased, while the pressure remains constant.

From point 19 to point 21 gaseous refrigerant in the receiver is compressed by means of the receiver compressor, thereby increasing the enthalpy as well as the pressure. It can be seen that it requires less energy to compress the refrigerant by means of the receiver compressor than by means of the main compressor.

From point 19 to point 14 gaseous refrigerant in the receiver is supplied to the suction line via a bypass valve, and is thereby mixed with refrigerant leaving the evaporator. Passing the refrigerant through the bypass valve causes the pressure to decrease while the enthalpy remains constant.

The position of the point 17 corresponds to the enthalpy of the refrigerant which leaves the heat rejecting heat exchanger and is supplied to the receiver. This enthalpy determines the liquid-vapour ratio of the refrigerant entering the receiver. Thus, when the enthalpy of the refrigerant entering the receiver is low, corresponding to the point 17 being arranged far to the left, a large portion of the refrigerant entering the receiver is liquid. Similarly, when the enthalpy of the refrigerant entering the receiver is high, corresponding to the point 17 being arranged far to the right, a large portion of the refrigerant entering the receiver is gaseous, i.e. in the form of vapour. The flow of vapour entering the receiver thereby depends on the enthalpy of the refrigerant leaving the heat rejecting heat exchanger, and the enthalpy of refrigerant leaving the heat rejecting heat exchanger may therefore advantageously be taken into account when estimating the flow of vapour entering the receiver.

Furthermore, the liquid-vapour ratio of the refrigerant in the receiver can be adjusted by adjusting the enthalpy of the refrigerant leaving the heat rejecting heat exchanger. This may be done by adjusting a secondary fluid flow across the heat rejecting heat exchanger, e.g. by adjusting a fan speed of one or more fans driving this flow. Adjusting the secondary fluid flow has an impact on the heat transfer taking place in the heat rejecting heat exchanger, and this in turn affects the enthalpy of the refrigerant leaving the heat rejecting heat exchanger.

In the case that the estimated flow of vapour entering the receiver is above a first threshold value, this is an indication that the amount of available gaseous refrigerant in the receiver is sufficient to allow the receiver compressor to operate appropriately, as described above. Accordingly, in this case the pressure prevailing inside the receiver is controlled by operating the receiver compressor. On the other hand, in the case that the estimated flow of vapour entering the receiver is below the first threshold value, the receiver compressor is kept in a switched off state, and the gaseous refrigerant in the receiver is instead supplied to the main compressor via the bypass valve.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a vapour compression system comprising a compressor unit comprising at least two compressors, a heat rejecting heat exchanger, a receiver, an expansion device and an evaporator arranged in a refrigerant path, the expansion device being arranged to control a supply of refrigerant to the evaporator, at least one of the compressors being a main compressor being fluidly connected to an outlet of the evaporator and at least one of the compressors being a receiver compressor being fluidly connected to a gaseous outlet of the receiver, the method comprising the steps of:

estimating a flow of vapour entering the receiver,
comparing the estimated flow to a first threshold value, and
in the case that the estimated flow is above the first threshold value, controlling a pressure prevailing inside the receiver by operating the receiver compressor.

2. The method according to claim 1, wherein the first threshold value is related to a minimum capacity of the receiver compressor.

3. The method according to claim 1, wherein the step of estimating the flow of vapour entering the receiver is performed based on a current compressor capacity of the compressor unit.

4. The method according to claim 1, wherein the step of estimating the flow of vapour entering the receiver is performed based on an enthalpy of refrigerant leaving heat rejecting heat exchanger.

5. The method according to claim 1, wherein the vapour compression system further comprises a pressure expansion device arranged in the refrigerant path between an outlet of the heat rejecting heat exchanger and an inlet of the receiver, and wherein the step of estimating the flow of vapour entering the receiver is performed based on a flow through the pressure expansion device.

6. The method according to claim 1, wherein the vapour compression system further comprises a bypass valve fluidly interconnecting the gaseous outlet of the receiver and the main compressor, the method further comprising the steps of:

comparing the estimated flow to a second threshold value, and in the case that the estimated flow is above the second threshold value, opening the bypass valve and controlling the pressure prevailing inside the receiver by operating the receiver compressor and the bypass valve.

7. The method according to claim 6, wherein the second threshold value is related to a maximum capacity of the receiver compressor.

8. The method according to claim 1, further comprising the step of, in the case that the estimated flow is below the first threshold value, maintaining the receiver compressor in a non-operating state in the case that it is not operating.

9. The method according to claim 8, wherein the vapour compression system further comprises a bypass valve fluidly interconnecting the gaseous outlet of the receiver and the main compressor, the method further comprising the step of controlling a pressure prevailing inside the receiver by means of the bypass valve.

10. The method according to claim 1, wherein the vapour compression system further comprises an air condition unit having an outlet being fluidly connected to an inlet of the receiver, and wherein the step of estimating the flow of vapour into the receiver is performed based on a load of the air condition unit.

11. The method according to claim 2, wherein the step of estimating the flow of vapour entering the receiver is performed based on a current compressor capacity of the compressor unit.

12. The method according to claim 2, wherein the step of estimating the flow of vapour entering the receiver is performed based on an enthalpy of refrigerant leaving heat rejecting heat exchanger.

13. The method according to claim 3, wherein the step of estimating the flow of vapour entering the receiver is performed based on an enthalpy of refrigerant leaving heat rejecting heat exchanger.

14. The method according to claim 2, wherein the vapour compression system further comprises a pressure expansion device arranged in the refrigerant path between an outlet of the heat rejecting heat exchanger and an inlet of the receiver, and wherein the step of estimating the flow of vapour entering the receiver is performed based on a flow through the pressure expansion device.

15. The method according to claim 3, wherein the vapour compression system further comprises a pressure expansion device arranged in the refrigerant path between an outlet of the heat rejecting heat exchanger and an inlet of the receiver, and wherein the step of estimating the flow of vapour entering the receiver is performed based on a flow through the pressure expansion device.

16. The method according to claim 4, wherein the vapour compression system further comprises a pressure expansion device arranged in the refrigerant path between an outlet of the heat rejecting heat exchanger and an inlet of the receiver, and wherein the step of estimating the flow of vapour entering the receiver is performed based on a flow through the pressure expansion device.

17. The method according to claim 2, wherein the vapour compression system further comprises a bypass valve fluidly interconnecting the gaseous outlet of the receiver and the main compressor, the method further comprising the steps of:

comparing the estimated flow to a second threshold value, and in the case that the estimated flow is above the second threshold value, opening the bypass valve and controlling the pressure prevailing inside the receiver by operating the receiver compressor and the bypass valve.

18. The method according to claim 3, wherein the vapour compression system further comprises a bypass valve fluidly interconnecting the gaseous outlet of the receiver and the main compressor, the method further comprising the steps of:

comparing the estimated flow to a second threshold value, and in the case that the estimated flow is above the second threshold value, opening the bypass valve and controlling the pressure prevailing inside the receiver by operating the receiver compressor and the bypass valve.

19. The method according to claim 4, wherein the vapour compression system further comprises a bypass valve fluidly interconnecting the gaseous outlet of the receiver and the main compressor, the method further comprising the steps of:

comparing the estimated flow to a second threshold value, and in the case that the estimated flow is above the second threshold value, opening the bypass valve and controlling the pressure prevailing inside the receiver by operating the receiver compressor and the bypass valve.

20. The method according to claim 5, wherein the vapour compression system further comprises a bypass valve fluidly interconnecting the gaseous outlet of the receiver and the main compressor, the method further comprising the steps of:

comparing the estimated flow to a second threshold value, and in the case that the estimated flow is above the second threshold value, opening the bypass valve and controlling the pressure prevailing inside the receiver by operating the receiver compressor and the bypass valve.

* * * * *